J. H. COY.
FERTILIZER DISTRIBUTER.
APPLICATION FILED FEB. 19, 1916.
1,200,590.
Patented Oct. 10, 1916.
2 SHEETS—SHEET 2.
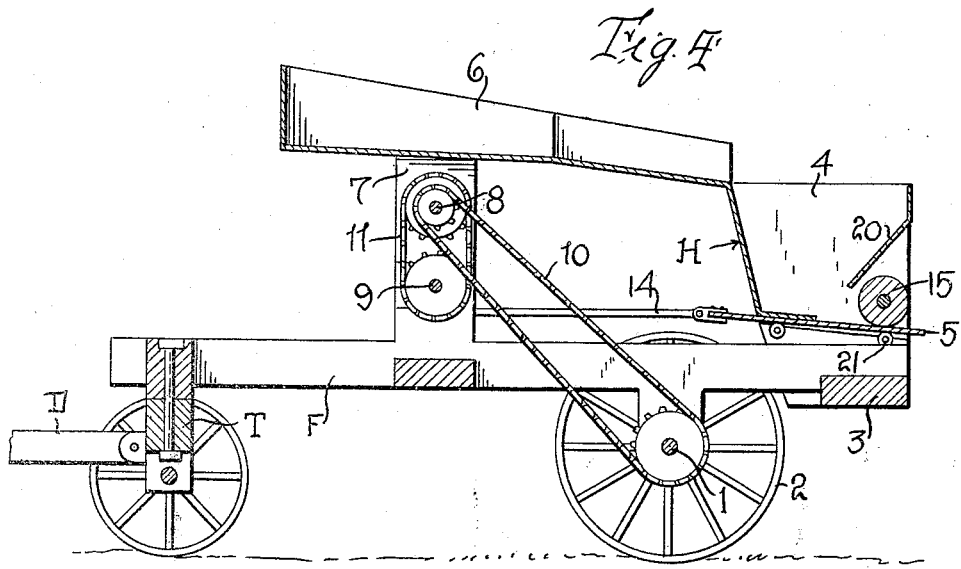
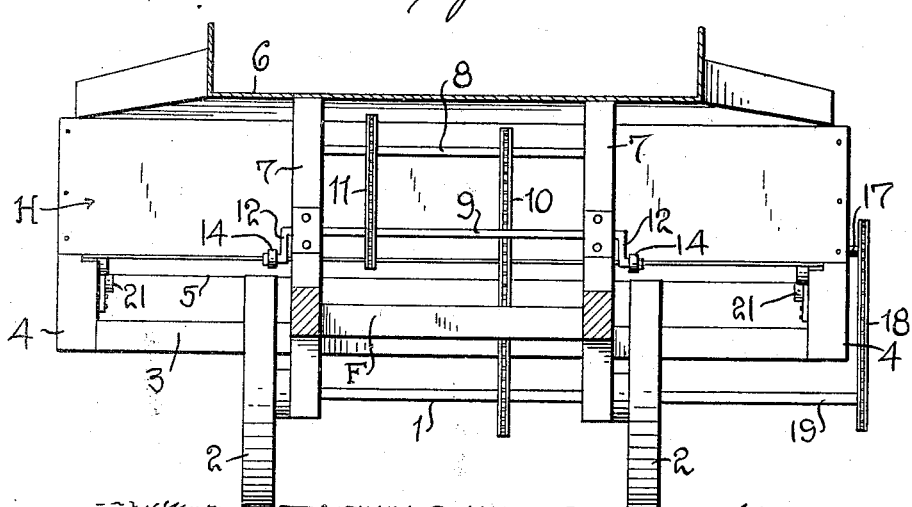
Inventor
J. H. COY
By Watson E. Coleman
Attorney

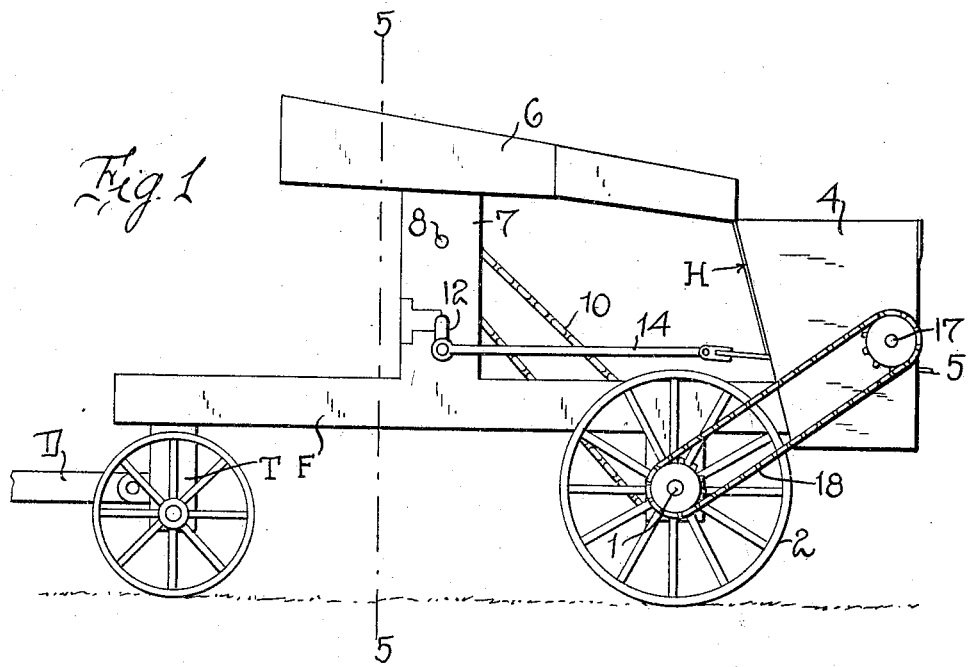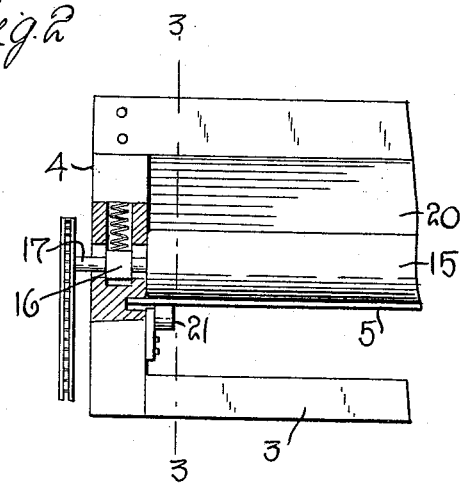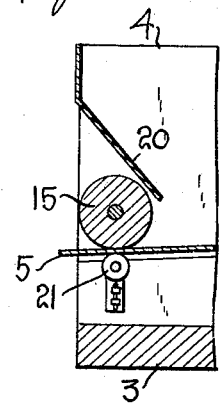

UNITED STATES PATENT OFFICE.

JAMES H. COY, OF LOCKWOOD, MISSOURI.

FERTILIZER-DISTRIBUTER.

1,200,590.

Specification of Letters Patent.

Patented Oct. 10, 1916.

Application filed February 19, 1916. Serial No. 79,416.

*To all whom it may concern:*

Be it known that I, JAMES H. COY, a citizen of the United States, residing at Lockwood, in the county of Dade and State of Missouri, have invented certain new and useful Improvements in Fertilizer-Distributers, of which the following is a specification, reference being had to the accompanying drawings.

This invention relates to certain improvements in fertilizer distributers and it is an object of the invention to provide a novel and improved device of this general character wherein the fertilizer is effectively discharged and evenly distributed.

It is also an object of the invention to provide a novel and improved device of this general character including a hopper provided with a reciprocating bottom whereby the requisite discharge of the fertilizer is assured and wherein said reciprocating bottom is capable of vertical adjustment in order to control the quantity of fertilizer to be discharged.

Furthermore it is an object of the invention to provide a novel and improved device of this general character including a roller overlying the reciprocating feed bottom which serves to assure the discharge of wet fertilizer, and which is also yieldably supported so that any hard substances contained in the fertilizer may be passed thereunder without interfering with the operation of the device.

The invention consists in the details of construction and in the combination and arrangement of the several parts of my improved distributer whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood I will now proceed to describe the same with reference to the accompanying drawings, wherein—

Figure 1 is an elevational view illustrating a fertilizer distributer constructed in accordance with an embodiment of my invention; Fig. 2 is an enlarged fragmentary view partly in elevation and partly in section illustrating certain features of my invention as herein embodied; Fig. 3 is a sectional view taken substantially on the line 3—3 of Fig. 2; Fig. 4 is a longitudinal vertical sectional view taken through the device as disclosed in Fig. 1; and Fig. 5 is a sectional view taken substantially on the line 5—5 of Fig. 1.

As disclosed in the accompanying drawings, F denotes a frame of predetermined configuration having its rear portion supported by the transversely disposed shaft 1 to which are affixed the supporting wheels 2 adapted to contact with the surface over which the device is drawn and which results in the requisite rotation of the shaft 1. The forward end of the frame F is supported by the steering truck T of any conventional character and to which the draft-rigging D is engaged, said draft-rigging also being of any desired type and forms no part of my present invention.

Disposed transversely of the frame F at the rear thereof is the beam 3 having its opposite ends provided with the up standing side walls 4 of predetermined configuration and which serve as a support for the hopper H, the lower marginal portion of the hopper terminating at a point inwardly of the forward vertical edges of the side walls 4, and discharging upon the feeding bottom 5 supported for reciprocatory movement by the side walls 4, whereby the fertilizer, such as lime, is effectively discharged rearwardly of the device. The hopper H has also in communication therewith the box body 6 in which the supply of fertilizer to be distributed is initially delivered.

Extending upwardly from opposite sides of the frame F at a point rearwardly of the hopper H are the uprights 7 in which are rotatably supported the vertically alined shafts 8 and 9, the shaft 8 being operatively engaged through the medium of the chain 10 with the shaft 1 and the shafts 8 and 9 are operatively connected in a conventional manner through the medium of the chain 11. The opposite ends of the shaft 9 are extended and provided with the cranks 12 with which are operatively engaged the rods or pitmen 14 also operatively engaged with the rear marginal portion of the reciprocatory feeding bottom 5, whereby it will be perceived that the requisite reciprocatory movement will be imparted thereto during the travel of the machine.

Positioned above the feed bottom 5 and rotatably supported by the side walls 4 is the roller 15, the extremities of which being positioned within the bearings 16 yieldably supported by said side walls 4, whereby it will be readily perceived that any hard substances contained within the fertilizer may readily pass under the roller without interfering with the operation of the machine. It will also be noted that the roller 15 serves to assure the proper delivery of the fertilizer especially when the same may be wet. One extremity of the roller 15 has an extended shaft 17 operatively engaged through the medium of the sprocket chain 18 with the extended portion 19 of the shaft 1, whereby it will be perceived that the requisite axial rotation will be imparted to the roller 15.

The side walls 4 have interposed therebetween and above the roller 15, the deflector member or wall 20 having its lower marginal portion arranged inwardly of the roller at a point below the upper portion thereof, whereby it will be perceived that the passage of the fertilizer over the roller is prevented. It is also to be observed that the feed bottom 5 is positioned upon the supporting rollers 21 arranged for vertical adjustment, whereby the feed bottom 5 may be readily adjusted relative to the roller 15 in order to vary the amount of fertilizer discharged from the hopper H.

By this arrangement it has been found in practice that the distribution of fertilizer per acre may be readily regulated.

From the foregoing description, it is thought to be obvious that a distributer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A fertilizer distributer comprising a hopper, a movable bottom for said hopper, means for reciprocating said bottom, a roller rotatably supported above the discharge portion of the movable bottom, and means for vertically adjusting the movable bottom relative to the roller.

In testimony whereof I hereunto affix my signature in the presence of two witnesses.

JAMES H. COY.

Witnesses:
A. F. HAUBEIN,
CALVIN S. CROW.

Copies of this patent may be obtained for five cents each, by addressing the "Commissioner of Patents, Washington, D. C."